United States Patent [19]

Reed, Jr. et al.

[11] Patent Number: 4,598,405
[45] Date of Patent: Jul. 1, 1986

[54] LASER APPARATUS WITH ELECTRO-OPTIC Q-SWITCH ASSEMBLY

[75] Inventors: Edward D. Reed, Jr.; George J. Benedict, both of Sunnyvale, Calif.

[73] Assignee: GTE Communication Products Corporation, Stamford, Conn.

[21] Appl. No.: 565,567

[22] Filed: Dec. 27, 1983

[51] Int. Cl.$^4$ ............................................. H01S 3/115
[52] U.S. Cl. ..................................... 372/12; 372/106
[58] Field of Search ................. 372/12, 9, 18, 19, 27, 372/106

[56] References Cited

U.S. PATENT DOCUMENTS

| | | | |
|---|---|---|---|
| 3,497,828 | 2/1970 | Telk et al. | 372/12 |
| 3,740,663 | 6/1973 | Andringa | 372/12 |
| 3,783,406 | 1/1974 | Hook et al. | 372/12 |
| 3,831,106 | 8/1974 | Ward | 372/12 |
| 3,914,710 | 10/1975 | Young | 372/12 |
| 4,019,156 | 4/1977 | Fountain et al. | 372/12 |
| 4,375,684 | 3/1983 | Everett | 372/12 |
| 4,441,186 | 4/1984 | Erickson | 372/12 |

Primary Examiner—James W. Davie
Assistant Examiner—Robert E. Wise
Attorney, Agent, or Firm—John F. Lawler; Douglas M. Gilbert

[57] ABSTRACT

Laser apparatus with an electro-optic Q-switch assembly comprises a lasing medium which produces an unpolarized light beam when pumped, a polarizing beam splitter dividing the unpolarized beam into two orthogonally polarized parallel sub-beams, and a totally reflecting turning element which returns each sub-beam to the beam splitter along the path of the other sub-beam. A Q-switch is located in the path of one of the sub-beams. When the Q-switch is energized, the reflected polarization-shifted sub-beams are recombined at the splitter and pass through the lasing medium and adjacent partially-reflecting element as the output. When the Q-switch is deenergized, the sub-beams are dumped at the splitter which prevents the laser from oscillating.

4 Claims, 4 Drawing Figures

LASER APPARATUS WITH ELECTRO-OPTIC Q-SWITCH ASSEMBLY

BACKGROUND OF THE INVENTION

This invention relates to lasers, and particularly to an improved Q-switched laser apparatus.

Q-switching is a well-known technique for obtaining intense, very short (approximately 10 nanoseconds) optical pulses from a preferably high gain laser. A Q-switch is an optical switch which can be very rapidly changed from a condition in which it blocks the passage of light to one in which it transmits the light. Many solid state Q-switches use an electro-optic crystal to which a voltage is applied to modify the state of polarization of light passing through it, and causes the laser to change from a "no lase" to a lase condition. It is essential to the operation of the Q-switch that light transmitted through the crystal be polarized and thus a polarizer is a required component of the device.

With neodymium yttrium aluminum garnet (Nd:YAG) laser rods, optical pumping causes the rod to scramble the polarization of polarized light passing through the rod. The degree of this scrambling, due to thermal birefringence, ranges from small (few percent) to large (tens of percent) depending on operating conditions and represents an optical loss. This makes the laser less efficient when used with the conventional Q-switching arrangements in which the polarized light transits the Nd:YAG rod.

In another prior art Q-switch arrangement, the two orthogonally polarized outputs of the polarizer are directed through separate Q-switch crystals which are operated in synchronism, thereby salvaging the normally dumped output of conventional Q-switch systems. The disadvantages are the requirement of two Q-switch crystals, an extra resonator end mirror, and an additional highly-alignment-sensitive optical element, the polarizer in reflection.

This invention is directed to a Q-switched laser system which overcomes the disadvantages enumerated above.

OBJECTS AND SUMMARY OF THE INVENTION

A general object of the invention is the provision of Q-switched laser apparatus which is energy efficient.

A further object is the provision of such apparatus in which alignment of the optical components is readily achieved and maintained.

Still another object is the provision of such apparatus having relatively few components.

A further object is the provision of a Q-switched laser in which optical stress birefringence loss is substantially reduced.

These and other objects of the invention are achieved with a Q-switch assembly having a polarizing beam splitter which divides an unpolarized laser beam into two parallel orthogonally polarized sub-beams, passing one of the sub-beams through a Q-switch, and redirecting or reflecting each sub-beam back along the path of the other sub-beam to the polarization splitter. When the Q-switch is off, i.e., deenergized, the reflected sub-beams are dumped from the laser cavity by the polarization splitter. When the Q-switch is energized, the resultant 90° polarization shift in each sub-beam causes the polarization splitter to recombine them into an unpolarized beam that traverses the lasing medium and produces an output.

DESCRIPTION OF PREFERRED EMBODIMENT

Figure 1:
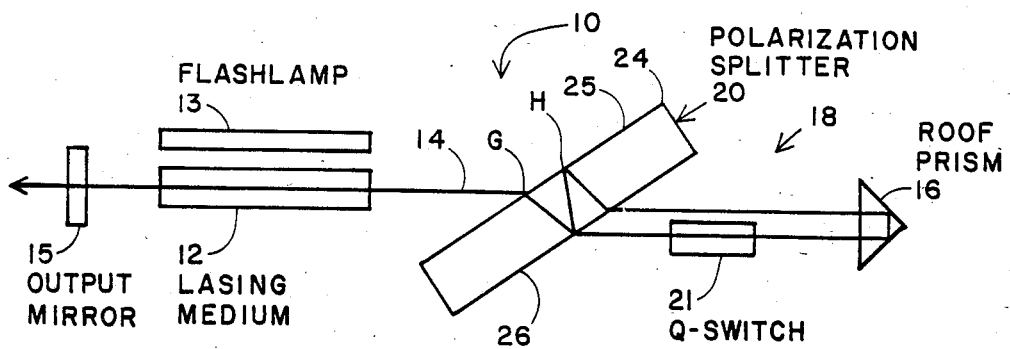
FIG. 1 is a schematic elevation view of laser apparatus embodying the invention.

Referring not to the drawings, FIG. 1 illustrates laser apparatus 10 embodying the invention and comprising a lasing medium 12 such as a Nd:YAG rod, a flashlamp 13 adjacent to medium 12 for energizing medium 12 to produce a laser beam 14 along the optical axis of the apparatus, a partially optically transmissive output reflecting element 15 traversing the optical axis and spaced from one end of medium 12, a totally reflecting element 16 traversing the optical axis and spaced from the other end of medium 12, and a Q-switch assembly 18 between medium 12 and element 16. The output of the apparatus is transmitted from element 15 as indicated by the arrow when Q-switch assembly 18 is activated as explained below.

Figure 2:
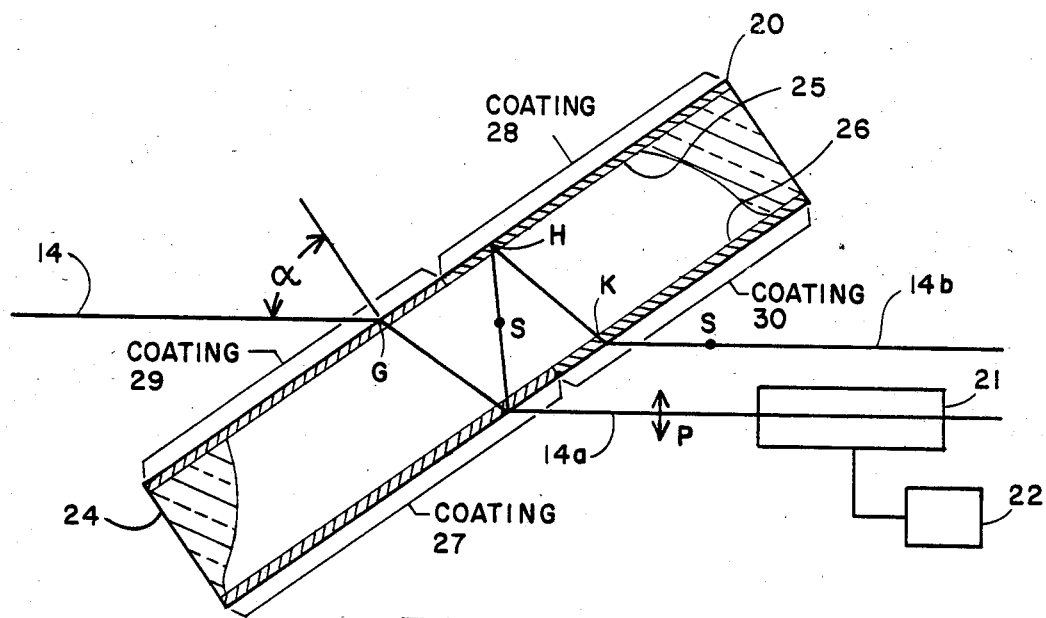
FIG. 2 is an enlarged view of part of FIG. 1 showing details of construction of the polarization splitter.

Q-switch assembly 18 consists of a polarization splitter 20 and a Q-switch 21 connected to a source 22 of voltage, see FIG. 2. Polarization splitter 20 comprises a block 24 of transparent optical quality glass such as BK-7 schlieren grade glass having precisely parallel plane first and second surfaces 25 and 26, respectively, preferably parallel to one arc second and having surface quality of 20–10. Block 24 is oriented so that surface 25 is inclined relative to the path of beam 14, preferably at an angle to provide an angle of incidence α of beam 14, which, by way of example, may be approximately 57°. The part of block surface 26 approximately opposite the point G of incidence of beam 14 on surface 25 has a dielectric polarizing coating 27 which transmits sub-beam 14a having linear polarization P and reflects sub-beam 14b having linear polarization S at a right angle to polarization P. Sub-beam 14b is reflected by coating 27 to a point H of incidence with surface 25, which point is covered by a highly reflective dielectric coating 28, and is again reflected by coating 28 to a point of intersection K with surface 26 from which sub-beam 14b emerges precisely parallel to sub-beam 14a. Coatings 27 and 28 are standard compositions prepared according to design specifications including the desired angle of incidence, desired reflectivity and ability to withstand without degradation Q-switched light pulses at a selected wavelength, power density and pulse repetition frequency. Such coatings are available, for example, from CVI Corp., Albuquerque, NM.

In order to enhance the efficiency of optical transmission of block 24, anti-reflective coatings 29 and 30 are applied to surface 25 at point G and to surface 26 opposite point H, respectively. Coatings 29 and 30 may be and preferably are identical.

Q-switch 21 is disposed in the path of one of the sub-beams, for example, sub-beam 14a as shown in drawing. Switch 21 may comprise a crystal of lithium niobate which when energized by a pulse from voltage source 22 rotates the polarization of sub-beam 14a by 90° for a period several times the duration of the pulse, typically 10 ns.

Reflecting element 16, see FIG. 1, consists of a turning or roof prism positioned to receive both sub-beams 14a and 14b and to totally reflect each sub-beam along the path of the other. In other words, element 16 reflects sub-beam 14a back toward block 24 along the path of sub-beam 14b and the latter along the path of sub-beam 14a.

Figure 3:
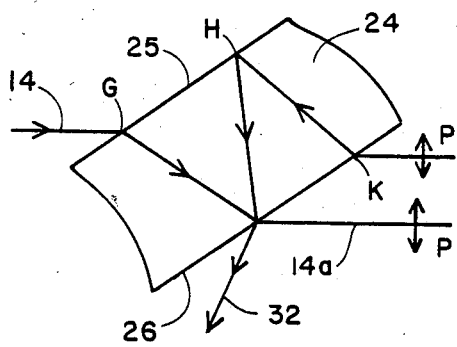
FIGS. 3 and 4 are schematic views showing the two reflected sub-beam propagation paths, respectively, through the polarization splitter when the Q-switch is off.
Figure 4:
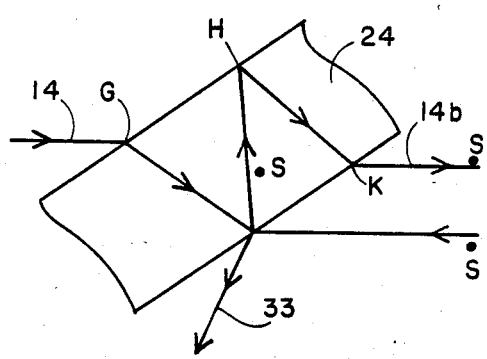

In operation, with Q-switch deenergized and rod 12 pumped by lamp 13, an unpolarized beam 14 propagates to point G on surface 25 of block 24, see FIGS. 3 and 4, is refracted through the block to polarization coating 27 which transmits sub-beam 14a of polarization P and reflects sub-beam 14b of polarization S. Sub-beam 14b is again reflected by coating 28 and emerges from block surface 26 precisely parallel to sub-beam 14a, i.e., parallel to within one arc-second. Each sub-beam is reflected by element 16 back along the path of the other sub-beam and sub-beam 14a, after reflection from coating 28, is transmitted by polarizing coating 27 out of the laser cavity as indicated at 32 in FIG. 3. Similarly, sub-beam 14b is reflected by polarizing coating 27 out of the laser cavity as indicated at 33 in FIG. 4. Thus the laser is prevented from oscillating.

Upon energizing Q-switch 21 with a transient half wave voltage from source 22, the polarization of each sub-beam is rotated by 90° as it passes through the Q-switch crystal so that polarizing coating 27 transmits sub-beam 14b reflected from element 16 and reflects sub-beam 14a as it propagates from point H. The two sub-beams are thus recombined and enter rod 12 to complete the lasing cycle and produce an output from element 15.

Apparatus embodying this invention has been built and successfully tested on a Nd:YAG laser using an LiNbO$_3$ Q-switch crystal triggered by a 6 KV pulse at 100 Hz and producing output at 1.06 μm wavelength, with 60-100 mJ pulses having 14-19 ns pulse widths.

A principal advantage of the invention is that the oscillating beam is unpolarized so that optical stress birefringence loss in the laser rod is essentially eliminated. This substantially improves the quality of the output beam. Another important advantage is the reduction of alignment sensitivity of the components by use of a single polarizing block and a turning prism.

What is claimed is:

1. In a laser apparatus with a lasing medium having an optical axis, means to energize said medium for producing an unpolarized laser beam along said optical axis, a first partially optically transmissive reflecting element traversing said axis spaced from one end of said medium, and a second totally reflecting element traversing said axis and spaced from the opposite end of said medium, the improvement of a Q-switch assembly traversing said axis between said medium and said second element comprising:

a polarizing beam splitter adjacent to said other end of the lasing medium and a Q-switch between said splitter and said second element;

said splitter comprising a transparent optical glass block having first and second plane parallel external surfaces, said first surface being proximate to said lasing medium and being inclined at an angle less than 90° relative to said laser beam whereby to refract said unpolarized beam propagating from said medium to a first point of intersection with said second surface, a dielectric polarizing coating on said second surface at said first point of intersection, said coating constituting means for dividing said unpolarized laser beam into first and second sub-beams, said first sub-beam having a first polarization and propagating through said coating in a first direction, said second sub-beam having a second polarization orthogonal to said first polarization and being reflected by said coating to a second point of intersection with said first surface of said block, said first surface having a highly reflective coating at said second point of intersection, said second sub-beam being reflected from said second point to a third point of intersection with said second surface separated from said first point of intersection, said second sub-beam being refracted at said third point of intersection on said second surface whereby to propagate therefrom in a second direction parallel to said first direction;

said second reflecting element intersecting said first and second parallel sub-beams and redirecting each sub-beam back toward said second surface along the path of the other sub-beam;

a Q-switch between said second block surface and said second element in the path of only one of said sub-beams; and means to energize said Q-switch whereby to change the polarization of each of said sub-beams by 90° and cause them to recombine at said block for propagation along said optical axis through said lasing medium and said first element as the output from said laser apparatus.

2. Q-switched laser apparatus having a laser cavity and comprising:

a lasing medium having an output constituting an unpolarized light beam;

means to energize said medium to produce said beam;

a first partially reflective element and a second totally reflective element spaced from opposite ends of said medium and traversing the path of said beam, said first and second elements defining said laser cavity; and a Q-switch assembly between said medium and said second element in the path of said beam comprising:

means for splitting said beam into first and second parallel linearly orthogonally polarized sub-beams;

Q-switch means in the path of one of said sub-beams;

means to selectively energize said Q-switch means and to shift the polarization angle of a sub-beam passing therethrough by 90°;

said second element comprising a turning prism, said prism being disposed in the path of each sub-beam propagating from said beam splitting means, each sub-beam being reflected by said prism toward said beam splitting means along the path of the other sub-beam;

said beam splitting means having polarization filter means, said reflected sub-beam incident on said filter means being redirected thereby out of said cavity when said Q-switch means is not energized and being recombined thereby into a single beam along the path of the initial unpolarized beam when said Q-switch means is energized, at least part of said single beam constituting an output from said first element.

3. The apparatus according to claim 2 in which said beam splitting means comprises a transparent glass block having parallel external first and second surfaces, respectively, proximate to and remote from said lasing medium and traversing the path of said beam from said lasing medium, said surfaces being disposed at an acute angle relative to the direction of propagation of said beam from said lasing medium, said filter means comprising a dielectric polarization-sensitive coating on said second surface at the point of intersection of said unpolarized beam therewith, said first sub-beam having a first polarization being transmitted by said second coating, said second sub-beam having a second polarization orthogonal to said first polarization being reflected by said coating.

4. The apparatus according to claim 3 in which said reflected second sub-beam intersects said first surface at a point spaced from the point of intersection therewith by said unpolarized beam, and a highly reflective coating on said first surface at the point of intersection therewith by said second sub-beam.

* * * * *